United States Patent [19]
Sato

[11] 4,181,089
[45] Jan. 1, 1980

[54] CASETTE TAPE TAKE-UP INDICATOR
[75] Inventor: Masaaki Sato, Hachioji, Japan
[73] Assignee: Olympus Optical Co., Ltd., Tokyo, Japan
[21] Appl. No.: 870,719
[22] Filed: Jan. 19, 1978
[30] Foreign Application Priority Data
Jan. 21, 1977 [JP] Japan .................................. 52/6223
Jan. 21, 1977 [JP] Japan ............................. 52/6574[U]
[51] Int. Cl.² ...................... G01D 13/00; G11B 27/34
[52] U.S. Cl. .................................... 116/278; 116/303; 360/132
[58] Field of Search ............. 116/114 J, 67 A, 129 C, 116/129 H, 134, 114 AJ, 278, 303; 360/132; 242/199

[56] References Cited
U.S. PATENT DOCUMENTS

| 1,208,646 | 12/1916 | Power | 116/67 A |
| 3,335,695 | 8/1967 | Hayashi | 116/114 J |
| 3,630,170 | 12/1971 | Christo | 116/67 A X |
| 3,685,893 | 8/1972 | Castedello | 360/132 X |
| 3,833,185 | 9/1974 | Talavera | 360/132 X |

Primary Examiner—Daniel M. Yasich
Attorney, Agent, or Firm—Toren, McGeady and Stanger

[57] ABSTRACT

A tape cassette for a tape recorder comprises a cassette housing having a pair of hubs therein, a predetermined amount of magnetic tape wound around said hubs and a display member having widening resiliency provided between said hubs.

6 Claims, 6 Drawing Figures

FIG.1
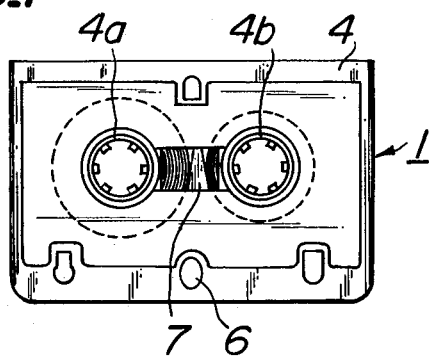
FIG.2
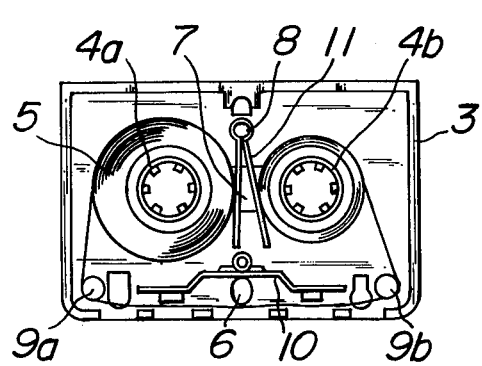
FIG.3
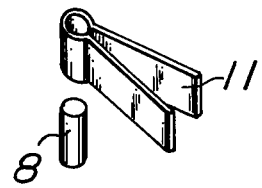
FIG.4
FIG.5
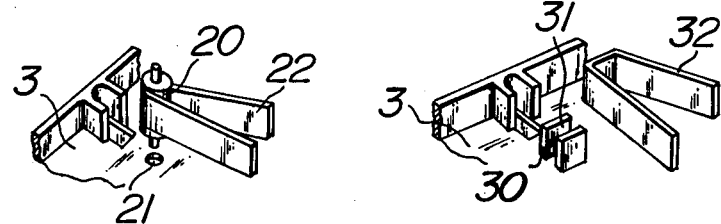
FIG.6
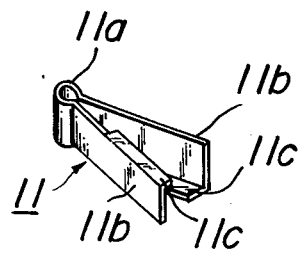

CASETTE TAPE TAKE-UP INDICATOR

BACKGROUND OF THE INVENTION

1. Field of the Invention

The present invention relates to a tape cassette which can provide an indication of the take-up amount of a tape.

2. Description of the Prior Art

In a tape cassette for tape recorders used at present, there is provided a transparent observing window for observing a take-up amount of a magnetic tape and a scale attached to the window shows the amount of movement of the tape. Observation at a bright location with adequate lighting is easy but if the location becomes darkened, the take-up amount is difficult to observe because of the dark color of a magnetic tape. Therefore, in a higher quality tape recorder, a light source such as a lamp and the like is arranged on the lower surface of a cassette loading chamber, to facilitate observance of the take-up amount of a tape. The use of a lamp in a portable tape recorder where a battery is used as an electric supply source presents problems because of an electric power loss or due to miniaturization requirements. A super-miniature cassette of the type particularly developed by the present applicant is, furthermore, provided with only a small observation window thereby making it very difficult to observe the take-up amount of a tape.

SUMMARY OF THE INVENTION

An object of the present invention is to eliminate the above described defects of the conventional tape cassette.

Another object of the present invention is to provide a tape cassette having a display member of relatively simple construction which can easily indicate a take-up amount of a tape.

According to the present invention a tape cassette for a tape recorder comprises a cassette housing having a pair of hubs therein, a predetermined amount of magnetic tape wound around said hubs and a display member having a widening resiliency provided between said hubs.

The display member is constructed in the form of V, and the V-shaped display member may be pivotally secured to a fixed supporting pin or the display member may be fixedly secured to a pivotal supporting pin.

The V-shaped display member may be colored in a bright color at an end surface of one leg portion and in a dark color at the end surface of another leg portion.

The V-shaped display member may be made wider at the end surface of at least one leg portion and the widened end surface of the leg portion may be colored in a bright color.

BRIEF DESCRIPTION OF THE DRAWING

FIG. 1 is a plan view showing one embodiment of the present invention;

FIG. 2 is a plan view exclusive of the upper housing wall member in the above embodiment;

FIG. 3 is a perspective view showing the display member in the same embodiment;

FIGS. 4 and 5 show other embodiments of the present invention; and

FIG. 6 is a perspective view showing the essential part of a modification of the display member shown in FIG. 3.

DESCRIPTION OF THE PREFERRED EMBODIMENTS

Referring now to FIGS. 1 and 2 one embodiment of a tape cassette according to the present invention is shown.

A tape cassette 1 comprises a housing having an upper housing wall member 2 and an overlapping lower housing wall member 3. A pair of rotatable tape hubs 4a, 4b, a magnetic tape 5 wound thereabout and means securing both ends of the tape to the hubs 4a, 4b are provided in the housing. On the center of the inner surface of, for example, the lower housing wall member 3 of the tape cassette 1 there is provided a supporting pin 8 at a position opposed to a capstan shaft inserting hole 6 and an observation window 7 is provided between the tape hubs 4a, 4b.

A tape take-up amount display or indicator member 11 attached to the supporting pin 8 consists of material such as plastic sheet, silicone paper and the like having a low coefficient of friction. That is, a sheet having almost the same width as that of the tape 5 is bent into the form of a V having an apex portion and a pair of legs and the bent or apex end is annularly formed for attachment to the supporting pin 8. The edge surfaces of the legs are colored in a bright color and a dark color, respectively.

The annular, bent apex end is attached to the supporting pin 8 so as to make the display member 11 contact with the tape 5 wound around the hubs 4a, 4b, and thereafter, the upper housing wall member 2 is placed in overlapped position over the lower housing wall member 3 and both the members are fixed with each other by a screw or the like.

With a tape cassette 1 constructed in the manner described, the edge surfaces of the display member 11 will be visible through the observation window 7, so that in the case of a portable tape recorder loaded with the cassette, the end surface of the display member 11 can provide an indication of the position of the tape 5 regardless of whether the device is viewed at a bright or dark location. The end surfaces of the display member 11, further, are colored in a bright color and a dark color, respectively, so that discrimination therebetween may be facilitated.

The amount of movement of the tape may thus be determined by means of the display or indicator member provided in the tape cassette, so that there is no need to illuminate the device with a lamp or the like. Thus, when a battery of small capacity is used, or when due to space requirements and the like a superminiature tape recorder is desired, consumption of wasteful power can be prevented and miniaturization may be enhanced. Further, in a superminiature cassette having a small observation window, the display effect of indicator means is maximized.

FIGS. 4 and 5 show another embodiment of the present invention. In FIG. 4, a supporting pin 20 is reduced or tapered at both ends for enabling it to be rotatably inserted into holes 21 bored in the upper and lower housing wall members, and in this case, a display member 22 is fixed to the supporting pin 20. Further, in FIG. 5, a supporting pin 30 is formed as an angular post, and provided at its center is a slot 31. Alternatively, two square columns may be made adjacent each other. A display member 32 bent into a U-shape is dropped or engaged in the slot 31. In both cases, there may be obtained an effect similar to that achieved with the embodiments previously described.

In an embodiment shown in FIG. 6, the take-up amount display or indicator member 11 comprises a plastic sheet having the same width as that of the tape 5 and bent into a V-shape so as to provide the widening resiliency. The member 11 is formed with a rolled or annular apex portion 11a for engaging with the supporting pin 8 so as to form therewith a pivotal fulcrum. Each of the leg portions 11b extending on both sides from the pivotal fulcrum or apex 11a is slightly bent inwardly to form a display portion 11c which is colored, with each display portion 11c being located on opposite sides of the member 11 and each extending in a direction opposite the other.

The thus formed display member 11 is mounted on the supporting pin 8 and is interposed between the hubs 4a, 4b thereby forming an indicator means for the cassette. When it is desired the colored display portion 11c may be observed from the observation window 7, and the position of the tape 5 in the cassette can positively be determined from the position of the display portion 11c. Accordingly, in a portable tape recorder, a moved amount of the tape can easily be confirmed by means of the display portion 11c regardless of whether a bright or a dark location is involved, and then, the following action accompanied to completion of a tape feeding can be prepared without fear of misrecording and the like.

In addition the present invention is not limited to the above embodiments but applied to any material, configuration and the like of a tape take-up amount display member. It is only preferable to use a material having comparatively better friction coefficient and elasticity. Further, the coloring of the leg end surfaces can be with the same color, and if a fluorescent paint is used, a take-up amount can easily be confirmed even at night.

As explained above, the present invention provides a tape cassette which can easily discriminate a take-up amount (moved amount) of a tape by providing a tape take-up amount display member in a tape cassette with a simple construction.

While specific embodiments of the invention have been shown and described in detail to illustrate the application of the inventive principles, it will be understood that the invention may be embodied otherwise without departing from such principles.

What is claimed is:

1. A tape cassette for a tape recorder comprising: a cassette housing; a pair of hubs rotatably mounted within said housing; a predetermined length of magnetic tape extending about both said hubs adapted to be reversibly wound therebetween; display window means in said housing; and indicator means positioned within said housing to be viewed through said display window means and arranged to clearly and visibly provide an indication of the position of said tape on said hubs; said indicator means comprising an easily observed indicator member having a V-shaped configuration including an apex portion and a pair of legs extending therefrom; and support means within said housing having said apex portion of said indicator member mounted thereon and pivotally securing said indicator member within said housing in a position to be viewed through said display window means; said V-shaped display member extending between said hubs with each of said legs arranged to extend from said apex portion with a spacing therebetween such that said legs are retained slidably engaged, respectively, against portions of said tape wound on one of said hubs, said display member having a widening resiliency provided between said hubs to maintain each of said legs in contact with said tape with a slight spring force.

2. A tape cassette according to claim 1 wherein said support means comprise a supporting pin pivotally secured to said cassette housing and wherein said V-shaped indicator member is fixedly secured to said pivotal supporting pin.

3. A tape cassette according to claim 1 wherein each of said legs of said indicator member are formed with edge portions on the same side of said indicator member and wherein the edge portion of one of said legs has a bright color applied thereto with the edge portion of the other leg having a dark color applied thereto.

4. A tape cassette according to claim 1 wherein said display window means comprise two display windows, each formed on opposite sides of said housing, said indicator member being arranged to be viewed through both said display windows.

5. A tape cassette according to claim 1 wherein said V-shaped indicator member is formed with at least one leg thereof having a widened portion viewable through said display window means.

6. A tape cassette according to claim 5 wherein said widened portion of said leg has a bright color applied thereto.

* * * * *